United States Patent [19]

Wüchner

[11] 4,426,178

[45] Jan. 17, 1984

[54] PIPE CUTTING AND THREADING DEVICE

[75] Inventor: Xaver Wüchner, Jestetten, Fed. Rep. of Germany

[73] Assignee: George Fischer Ltd., Switzerland

[21] Appl. No.: 308,534

[22] PCT Filed: Dec. 22, 1980

[86] PCT No.: PCT/CH80/00158
   § 371 Date: Sep. 29, 1981
   § 102(e) Date: Sep. 29, 1981

[87] PCT Pub. No.: WO81/02267
   PCT Pub. Date: Aug. 20, 1981

[30] Foreign Application Priority Data

Feb. 13, 1980 [CH] Switzerland .................. 1166/80

[51] Int. Cl.$^3$ .................. B23G 1/02; B23G 1/24
[52] U.S. Cl. .................. 408/28; 10/87; 10/89 P; 10/90
[58] Field of Search .................. 10/87, 89 R, 89 P, 90, 10/94, 96 R, 106, 107 R, 107 PH; 408/36, 146, 147, 173, 26, 28, 29

[56] References Cited

U.S. PATENT DOCUMENTS

| 1,943,643 | 1/1934 | Vosper | 10/106 |
| 2,614,435 | 10/1952 | Chasar | 10/106 X |
| 3,332,095 | 7/1967 | Ivester | 10/106 |
| 3,631,552 | 1/1972 | Ivester | 10/89 P |
| 3,662,414 | 5/1972 | Behnke | 10/89 P |

FOREIGN PATENT DOCUMENTS

| 546709 | 4/1956 | Belgium | 10/89 P |
| 2157787 | 5/1972 | Fed. Rep. of Germany . | |
| 1777391 | 10/1973 | Fed. Rep. of Germany . | |
| 2279512 | 2/1976 | France . | |
| 674650 | 6/1952 | United Kingdom . | |
| 2025279 | 1/1980 | United Kingdom . | |

Primary Examiner—E. Michael Combs
Attorney, Agent, or Firm—Roylance, Abrams, Berdo & Goodman

[57] ABSTRACT

An apparatus for cutting and threading pipe comprising a portable support frame formed by disengagable members, cutting and threading units mounted on the frame and a pipe clamp fixed to the frame between the cutting and threading units. The cutting and threading units have separate drive motors. The threading unit is slidably and rotatably mounted on a guide pipe for pivotal movement between operative and inoperative positions and for axial movement toward and away from the cutting unit during threading operations. The pipe clamp non-rotatably holds the pipe during the cutting and threading operations and extends the entire distance between the cutting and threading units when located closest to one another.

10 Claims, 5 Drawing Figures

PIPE CUTTING AND THREADING DEVICE

The invention relates to a portable pipe cutting and threading device or apparatus with separate drive motors for the cutting unit and the threading unit, wherein both drive motors are mounted on a common support and can be dismantled and carried by one person, and wherein the pipe clamp is placed between the cutting unit and the threading unit.

BACKGROUND OF THE INVENTION

Pipe cutting and threading devices are used for installing pipes in new buildings and for repair work in existing houses. In larger new buildings, the dimensions and the weight of such devices are only of limited importance, since they are used over a relatively long period of time, normally by several workers.

In the case of less extensive work, e.g., in single family homes, or repair work on existing pipe installations, it is important that the device be small and easy to transport, particularly since such work normally is accomplished by a single worker. This worker should be able to operate the device alone and to transport the device in a passenger car.

For transporting the device by a passenger car, it is particularly important that the device be capable of being dismantled. The dismantling of the device is also important even when it is transported by another type of vehicle, because dismantling makes the device easier to store and avoids the tendency to tip over.

Accordingly, the ability of the device to be easily and quickly dismantled and assembled is of utmost importance.

A known device of the type described above has the following disadvantages:

(a) For the cutting operation, the threading die head must be removed.

(b) The cutting is accomplished by a large circular saw blade.

(c) The cuttting blade does not produce clean edges.

(d) The cut in the pipe is not exact due to the large distance between the vise and the cutting blade and the pipe vibration during the cutting operation. For the same reason, the cutting creates an unpleasant noise.

(e) The drive motor for the threading operation is rather noisy.

(f) The cut edge on the pipe is not clean and requires an additional cleaning operation, e.g., by means of a file.

(g) The device provides only very limited space for storing tools, cutting oils, parts, etc.

BRIEF DESCRIPTION OF THE INVENTION

An object of the present invention is to provide an apparatus for cutting and threading pipe which does not possess the disadvantages listed above.

Another object of the present invention is to provide an apparatus for cutting and threading pipe which can change from the cutting operation to a threading operation, or vice versa, within a very short period of time and by a single manual operation only.

A further object of the present invention is to provide apparatus for cutting and threading pipe with a motor for the threading device having a low noise level and of standard commercial type to prevent noise and limit cost without special designs.

Yet another object of the present invention is to provide an apparatus for cutting and threading pipe providing clean and exact cuts so that no burrs are created which have to be removed in a separate operation.

A still further object of the present invention is to provide an apparatus for cutting and threading pipe with a cutting blade which is as small as possible to minimize the danger of injury and to improve the cutting-accuracy.

Still another object of the present invention is to provide an apparatus for cutting and threading pipe wherein the pipe is firmly held during the cutting operation to reduce vibrations and noise to a minimum and to ensure a perfect cut.

A further object of the present invention is to provide an apparatus for cutting and threading pipe with a single power connection for the cutting and the threading units.

Another object of the present invention is to provide an apparatus for cutting and threading pipe with a supply for cutting oil for the threading operation.

Other objects, advantages and salient features of the present invention will become apparent from the following detailed description of a preferred embodiment of the invention.

Briefly described, the present invention includes an apparatus for cutting and threading pipe comprising a portable support frame formed by disengageable members, cutting and threading units mounted on the frame and a pipe clamp fixed to the frame between the cutting and threading units. The cutting and threading units have separate drive motors. The threading unit is slidably and rotatably mounted on a guide pipe for pivotal movement between operative and inoperative positions and for axial movement toward and away from the cutting unit during threading operations. The pipe clamp non-rotatably holds the pipe during the cutting and threading operations and extends the entire distance between the cutting and threading units when located closest to one another.

The apparatus of the present invention has a very low noise level and guarantees clean cuts and a perfect thread.

The apparatus, including the frame, can be dismantled or assembled in a very short period of time. The different parts of the device are lightweight so that they easily can be carried by one worker.

The change from threading operations to cutting operations is made by pivoting the threading unit out of the way so that the pipe to be cut can be easily placed in position. When a change from cutting operations to threading operations takes place, the threading unit is pivoted back to its operative position.

A plate can be provided between the legs of the support frame to simplify storing of threading oil, tools and parts.

BRIEF DESCRIPTION OF THE DRAWINGS

Referring to the drawing which form a part of this specification, and wherein.

DETAILED DESCRIPTION OF PREFERRED EMBODIMENT

Figure 1:
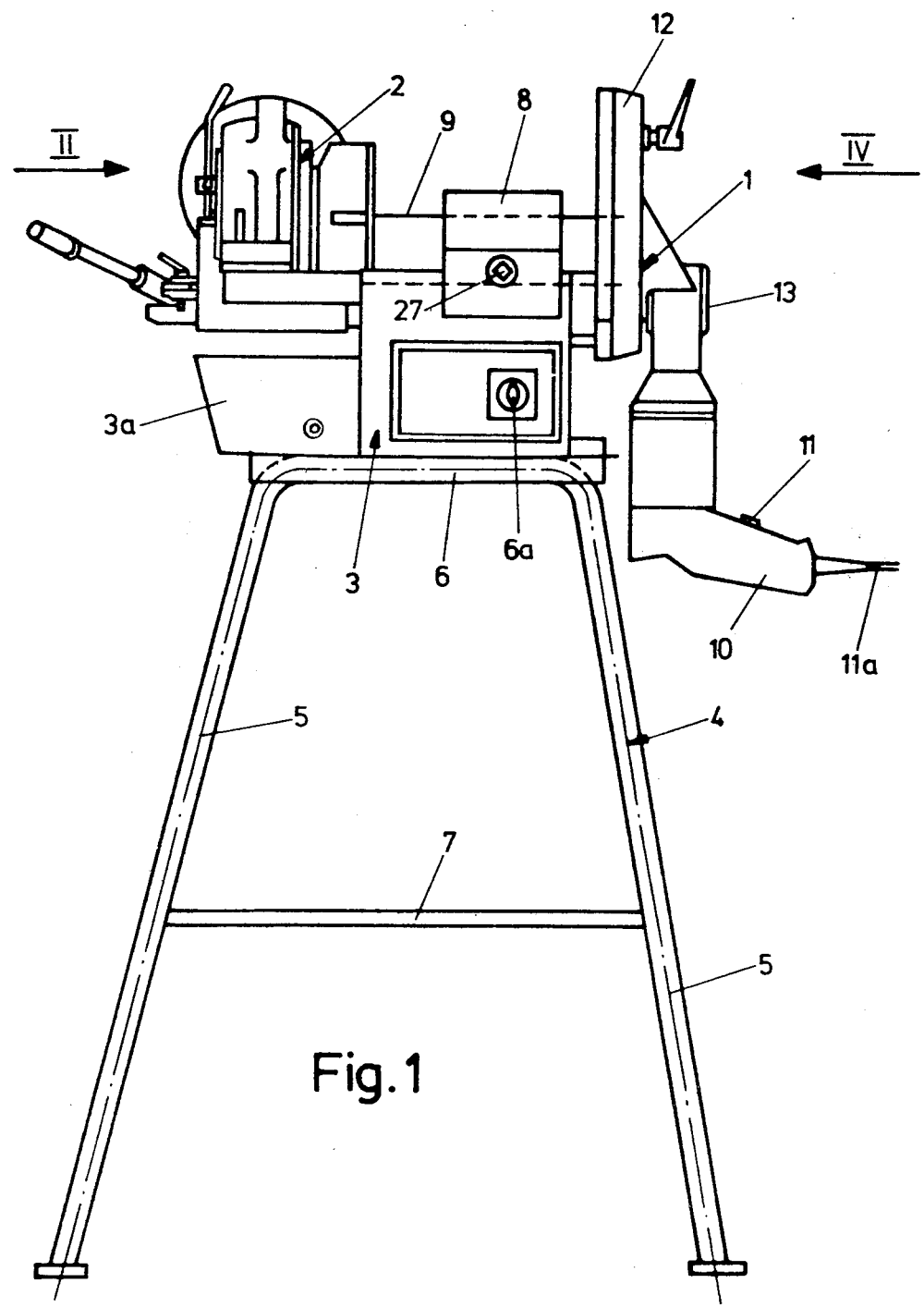
FIG. 1 is a side elevational view of an apparatus for cutting and threading pipe in accordance with the present invention.

Referring initially to FIG. 1, the apparatus of the present invention comprises a pipe cutting unit 1, a pipe threading unit 2, a support body 3 and a support frame 4. The support frame 4 has four feet or legs 5 which are made of two bent, diverging pipes held together by the support body. Legs 5 are fastened to support body 3 by screws extending through the middle portions 6 of the bent pipes. Approximately in the middle of legs 5, a plate 7 is fastened to legs 5 by screws or other means. The plate 7 is for storing parts and tools. The support frame is designed for simple and rapid assembly and disassembly. Alternatively, the support body can be placed on a workbench or table, in lieu of the support frame 4.

Both units 1 and 2 are removably mounted on the support body 3 so that one of them can be removed, as desired, if the apparatus is to be used for cutting or threading alone. The easy removal also permits both units 1, 2 and the support body 3 to be transported separately from each other.

A vise or clamping unit 8 is placed between the cutting and threading units 1, 2 for non-rotatably holding the pipe during the cutting and threading operations. Clamp or vise 8 extends the entire distance between the cutting unit and the threading unit when located in their closest relative positions.

Figure 2:
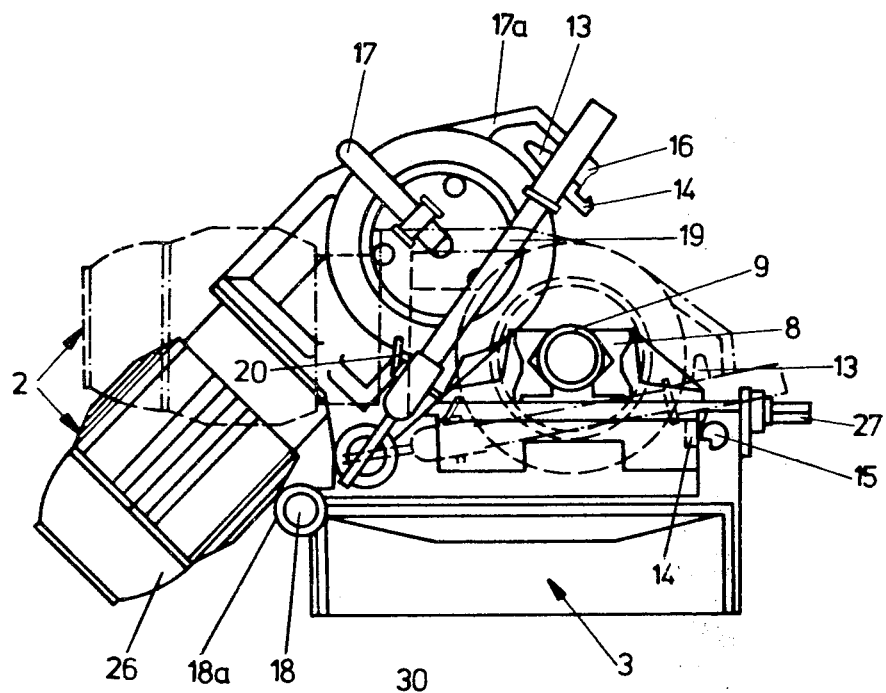
FIG. 2 is a partial end elevational view of the apparatus of FIG. 1 viewed in the direction of the arrow II, without the support frame.

FIG. 2 illustrates the threading unit 2 in a swung-out or inoperative position for facilitating cutting operations. Additionally, threading unit 2 is shown in dashed lines in the swung-in or operative position for threading operations. This pivoting movement is necessary to locate the threading unit 2 out of the way of a long pipe 9 to be cut into smaller pipe sections by the cutting unit 2. The cutting unit 1 does not interfere with the threading operation. During the threading operation, the pipe 9 can extend through a hole in the cutting unit 1.

When cutting, a small circular saw blade is moved radially toward and around the pipe 9 to cut through the pipe wall so that the pipe 9 is cut in a planetary manner. The saw blade guarantees a clean cut so that no rework is necessary before the pipe 9 is connected to another pipe or other fixture.

When cutting, a pistol-type handle 10 is moved by one hand, while an electric switch 11 is simultaneously operated to activate the power supply to the saw blade drive motor. By operation of the handle 11, the saw blade is moved toward the pipe 9 and, in a planetary way, around the outside of the pipe 9 until its wall has been cut. Slip contacts are provided in the cable 11a for connecting the power supply to the cutting unit in order to prevent the cable 11a from becoming twisted during the cutting operation.

As noted above, to provide sufficient space in the apparatus for the pipe to be cut by cutting unit 1, the threading unit 2 is pivoted or swung-out prior to commencing the cutting operation, as shown in FIG. 2. This pivoting or swinging movement is accomplished by a handle 17a on the motor housing which lifts the threading head. The threading unit 2 remains in its operative or inoperative position due to its own weight so that no auxiliary locking attachments or means are required. However, locking means can be used for holding the threading unit 2 in both positions. In the embodiment shown (FIG. 2), this locking means comprises a spring-biased lever 13 with a lock 14 which catches a stop body 15. The portion 16 of the threading unit 2 is covered by rubber or plastic to absorb shock when the threading unit contacts its support. For movement toward the inoperative position of the threading unit 2, a damping means 18a, e.g. a soft rubber pipe, is mounted on an axle 18 to absorb shock when this unit 2 is swung-out.

At the end of the threading unit 2, a lever 17 tensions the threading tool after its release. The threading tool is connected to the threading unit by a bayonet lock arrangement and can be exchanged within a few seconds.

Figure 5:
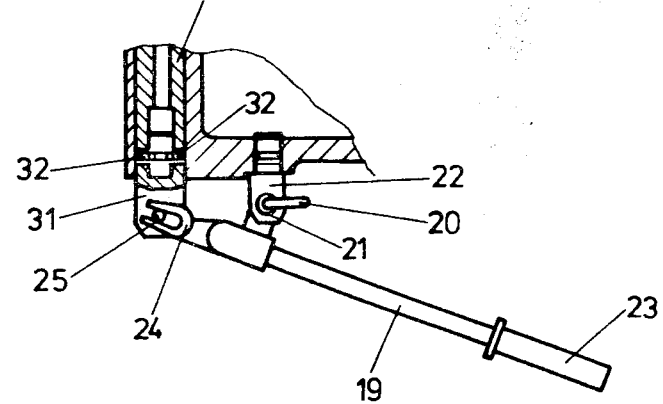
FIG. 5 is a partial, detailed view in section of the apparatus of FIG. 1 illustrating the swing level connection.

As illustrated in FIg. 5, the threading unit 2 can be pivoted about a guide pipe 30, which guide pipe also guides threading unit 2 when operated by a lever 19. A hook 20 engages a hole 21 in a plate 22 of the threading unit 2. The end 24 of the lever 19 remote from handle 23 is fork-shaped and engages a stud 25 in a fork-shaped head 31. The fork-shaped head 31 is rotatable in the pipe 30. However, the fork-shaped head 31 is held against an axial displacement relative to the pipe 30 by headless screws 32 extending through holes in pipe 30 into the interior of the pipe. Screws 32 engage a groove in the fork-shaped head 31. Therefore, the threading unit 2 can be moved in the axial direction of the pipe 30 toward and away from vise 8 and cutting unit 2 and be moved pivotally about pipe 30. Both movements are possible by means of the hook 20.

When the desired length of thread has been formed, the thread cutting wedges are automatically moved outwardly and the threading operation is interrupted. To ensure loosening or removal of the thread cutting wedges when forming threads on short pipes 9, an end switch 8a can be provided on the vise 8 (FIG. 3).

The drive motor 26 for the threading unit 2 is a three-phase motor of conventional commercial design. This motor has a very low noise level.

Figure 3:
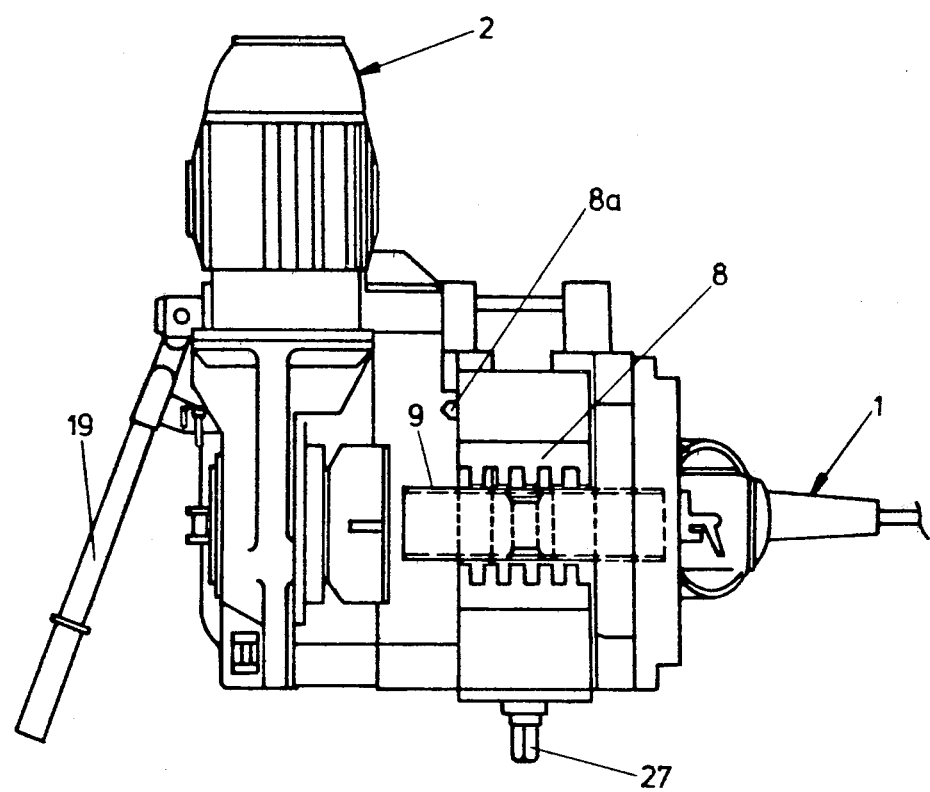
FIG. 3 is a partial top plan view of the apparatus of FIG. 1, without the support frame.

As illustrated in the top view of FIG. 3, the distance between the vise 8 and the cutting unit 1 is very small. Therefore, a perfect cut, practically without vibrations, is ensured. The arrangement of the vise also ensures a particularly quiet cutting operation. The vise 8 is being operated by a screw spanner which acts on a bolt or peg with a square head.

Figure 4:
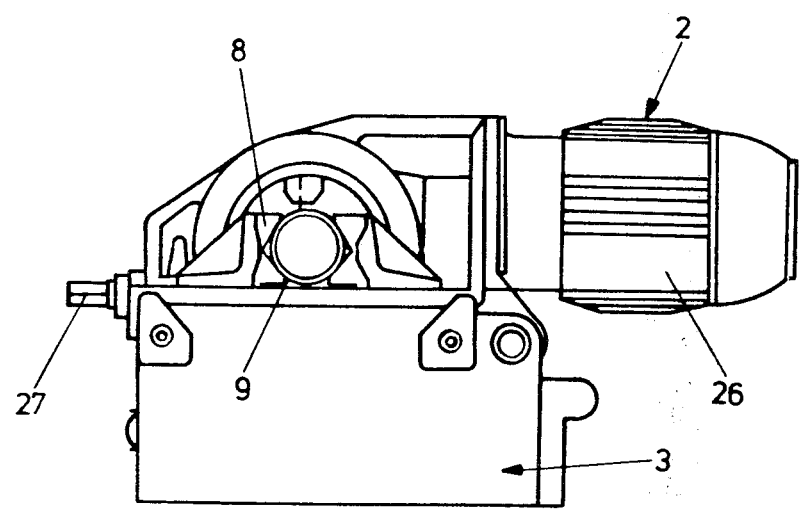
FIG. 4 is a partial end elevational view of the apparatus of FIG. 1, without the support frame and cutting unit, viewed in the direction of the arrow IV.

In FIG. 4, the apparatus is illustrated with cutting unit 1 removed. This arrangement is used when only threading operations are conducted for long time periods. On the other hand, the threading unit can be removed if the apparatus is used for cutting operations only during a relatively long time period.

FIG. 1 shows a switch 6a for the power supply. This switch 6a has a middle position (shown) and two side positions. In the middle position, the cutting unit 1 is connected to the power supply, which unit then can be operated by the pistol switch 11. In the side positions, the threading unit 2 is connected to the power supply for forming left or right hand threads. In these two side positions, the cutting unit 1 is not connected to the power supply. Thus, either the cutting unit 1 or the threading unit 2, but not both units at the same time, is connected to the power supply.

For rinsing and cooling during the threading operation, cutting oil and a hand pump are provided. The cutting oil is collected in a sump at the bottom of the chip container 3a below a mesh.

As compared to conventional cutting and threading apparatus, the present invention possesses the many advantages. The apparatus is relatively lightweight and can be easily and quickly dismantled into portable sections and then be easily and quickly reassembled. The section can be transported in a passenger car. The cut made in the pipe is clean and does not require any finishing work. A small circular saw blade is used which is inexpensive and readily available. The distance between the vice and the saw blade is very small so that the pipe is held firmly during the cutting operation for quiet operation. Use of a standard commercial-type motors permits operations to be performed at a very low noise level. For increased security, simultaneous operation of cutting unit and the threading unit is impossible. A shelf or table is provided for storing parts, cutting fluid and so on. The apparatus can advantageously be used for cutting short pipes.

While a certain advantageous embodiment has been chosen to illustrate the invention, it will be understood by those skilled in the art that various changes and modifications can be made therein without departing from the scope of the invention as defined in the appended claims.

What is claimed is:

1. An apparatus for cutting and threading pipe, comprising
   a portable support frame formed by disengageable members;
   a cutting unit mounted on said frame and having a first drive motor;
   a threading unit having a second drive motor separate from said first drive motor and mounting means for coupling said threading unit to said frame for pivotal movement between operative and inoperative positions and for axial movement toward and away from said cutting unit during threading operations, said mounting means including a guide pipe on which said threading unit is slidably and rotatably mounted; and
   pipe clamping means, mounted in a fixed axial position on said frame between said cutting unit and said threading unit, for non-rotatably holding pipe during cutting and threading operations, said pipe clamping means extending the entire distance between said cutting unit and said threading unit when said units are located in their closest relative axial positions.

2. An apparatus according to claim 1 wherein said frame comprises two generally U-shaped tubes having middle portions detachably coupled to a support body, said cutting unit and said threading unit being removably fastened on said support body.

3. An apparatus according to claim 2 wherein legs of said U-shaped tubes are connected at middle sections thereof.

4. An apparatus according to claim 3 wherein a square storage shelf connects said legs at said middle sections.

5. An apparatus according to claim 1 wherein said frame comprises a table.

6. An apparatus according to claim 1 wherein said second drive motor is of a low-noise design.

7. An apparatus according to claim 1 wherein said threading unit is moved by a lever pivotally coupled to said guide pipe.

8. An apparatus according to claim 7 wherein said lever is pivotally coupled to said pipe by a fork head extending into said guide pipe, said fork head having a circumferential groove positioned within said guide pipe, said guide pipe having screw pins extending radially therethrough and received in said circumferential groove.

9. An apparatus according to claim 8 wherein said fork head comprises an outer end located exteriorly of said guide pipe, said outer end having a slot with a pin thereacross slidably receiving a fork-shaped end of said lever.

10. An apparatus according to claim 9 wherein said lever is removably coupled, at a location spaced from said fork-shaped end, to said threading unit for moving said threading unit.

* * * * *